(12) United States Patent
Hsieh et al.

(10) Patent No.: US 9,583,961 B2
(45) Date of Patent: Feb. 28, 2017

(54) INTELLECTUAL POWER STORING SYSTEM AND METHOD FOR MANAGING BATTERY-ARRAY OF THE INTELLECTUAL POWER STORING SYSTEM

(71) Applicant: Kerties International Co., Ltd, New Taipei (TW)

(72) Inventors: Tsung-Yin Hsieh, New Taipei (TW); Shoei-Lai Chen, New Taipei (TW)

(73) Assignee: KERTIES INTERNATIONAL CO., LTD, New Taipei (TW)

( * ) Notice: Subject to any disclaimer, the term of this patent is extended or adjusted under 35 U.S.C. 154(b) by 187 days.

(21) Appl. No.: 14/588,905

(22) Filed: Jan. 3, 2015

(65) Prior Publication Data

US 2015/0372509 A1    Dec. 24, 2015

(30) Foreign Application Priority Data

Jun. 24, 2014   (TW) .............................. 103121786 A

(51) Int. Cl.
*H02J 7/00*    (2006.01)
*H02J 3/32*    (2006.01)
(Continued)

(52) U.S. Cl.
CPC ............. *H02J 7/007* (2013.01); *H01M 10/46* (2013.01); *H01M 10/465* (2013.01);
(Continued)

(58) Field of Classification Search
CPC .. H01M 10/46; H01M 10/465; H01M 10/482; H01M 2220/10; H02J 7/0042;
(Continued)

(56) References Cited

U.S. PATENT DOCUMENTS

| 2010/0017045 | A1 | 1/2010 | Nesler et al. | |
| 2010/0275905 | A1* | 11/2010 | Hall | H02J 7/355 126/621 |

(Continued)

FOREIGN PATENT DOCUMENTS

| EP | 2722958 A1 | 4/2014 |
| GB | 2321315 A | 7/1998 |
| JP | 2011250608 | 12/2011 |

OTHER PUBLICATIONS

The Search Report Dated Oct. 27, 2015 of the Corresponding European Patent Application No. 15170880.7.

*Primary Examiner* — Nathaniel Pelton
(74) *Attorney, Agent, or Firm* — Chun-Ming Shih; HDLS IPR Services

(57) ABSTRACT

An intellectual power storing system comprises an indoor-controlling device and a battery array which are arranged in a building. After booting, the indoor-controlling device receives power from a power company to be an initial power to provide to an indoor apparatus in the building. The indoor-controlling device also receives power from a self-generated power apparatus, and transforms the received power to store to the battery array. When stored power of the battery array reaches a threshold, the indoor-controlling device receives power from the battery array to provide to the indoor apparatus, and stops to receive power from the power company. The battery array in the present invention comprises a plurality of the batteries which are integrated into a decoration of the building respectively.

12 Claims, 9 Drawing Sheets

(51) Int. Cl.
*H02J 7/35* (2006.01)
*H01M 10/46* (2006.01)
*H01M 10/48* (2006.01)
*H02J 7/14* (2006.01)
*H02J 13/00* (2006.01)

(52) U.S. Cl.
CPC ............ *H01M 10/482* (2013.01); *H02J 3/32* (2013.01); *H02J 7/0021* (2013.01); *H02J 7/1423* (2013.01); *H02J 7/35* (2013.01); *H02J 7/355* (2013.01); *H01M 2220/10* (2013.01); *H02J 7/0047* (2013.01); *H02J 7/0063* (2013.01); *H02J 13/0006* (2013.01); *H02J 2007/005* (2013.01); *H02J 2007/0067* (2013.01); *Y02B 90/222* (2013.01); *Y02E 40/72* (2013.01); *Y04S 10/123* (2013.01); *Y04S 20/12* (2013.01)

(58) Field of Classification Search
CPC .... H02J 7/0044; H02J 7/0045; H02J 13/0006; H02J 2007/005; H02J 2007/0067; H02J 7/0021; H02J 7/0047; H02J 7/0063; H02J 7/007; H02J 7/1423; H02J 7/35; H02J 7/355; Y02B 90/222; Y02E 40/72; Y04S 10/123; Y04S 20/12
USPC .................................................. 320/101, 107
See application file for complete search history.

(56) References Cited

U.S. PATENT DOCUMENTS

| | | | |
|---|---|---|---|
| 2011/0025258 A1* | 2/2011 | Kim | H02J 7/0013 320/106 |
| 2011/0040418 A1 | 2/2011 | Kalen | |
| 2011/0140667 A1 | 6/2011 | Moon | |
| 2011/0273180 A1* | 11/2011 | Park | G01R 31/3627 324/427 |
| 2012/0212183 A1 | 8/2012 | Yamada et al. | |
| 2014/0094985 A1* | 4/2014 | Hibiya | H01M 10/44 700/297 |

* cited by examiner

INTELLECTUAL POWER STORING SYSTEM AND METHOD FOR MANAGING BATTERY-ARRAY OF THE INTELLECTUAL POWER STORING SYSTEM

BACKGROUND OF THE INVENTION

Field of the Invention

The invention relates to a power storing system, and in particularly to intellectual power storing system and managing method of a battery array of the power storing system.

Description of Related Art

In recent years, because of the consciousness of environmental protection, a variety of the green power building and the self-generated power apparatus are developed rapidly.

The well-known self-generated power apparatus mainly comprises the solar power generating machine, hydraulic power generating machine, wind power generating machine and so on. However, the common problem of above variety of self-generated power apparatus is that the transforming efficiency is too low to provide enough power stably and continuously. To achieve the purpose of providing enough power stably and continuously to a building for using, the power system still needs to connect to a power company and switch the power provided by the power company and the power generated by the self-generated power apparatus.

Furthermore, for using the self-generated power stably, the power system must build a battery with big power storing capacity (for example, using a big battery). When the environmental factors are well, the power system stores the power generated by the self-generated power apparatus. The power system uses the power stored in the batteries when in need. Thus, it can effectively decrease the usage of the power provided by the power company and further reduce the expense of the power.

However, it's potentially dangerous to using above big battery for the general public's perception. Furthermore, it must occupy the indoor space of the building (such as office or house) for installing the big battery. In addition, because the power generated by the self-generated apparatus can not completely replace the power provided by the power company, the user requests to switch the power source between the self-generated apparatus and the power company. This way also brought a lot of inconvenience for users.

Above problem makes the current public generally have a low desire for arranging the self-generated power apparatus, and it also makes the popularization of the self-generated power difficult to achieve.

SUMMARY OF THE INVENTION

The object of the present invention is providing an intellectual power storing system and method for managing battery-array of the intellectual power storing system, it can decide to provide a power to an indoor apparatus from a power company or a battery array for using according to a power storing capacity of the battery array.

The another object of the present invention is to provide an intellectual power storing system and method for managing battery array of the intellectual power storing system, it can compute a total power storing capacity and a power storing capacity according to a number of the batteries comprised in the battery array for determining a power storing/power providing mode of the battery array.

The another object of the present invention is to provide an intellectual power storing system and method for managing battery array of the intellectual power storing system, it can display the number of the batteries, a connecting architecture of the battery array and a location of each battery via a human-machine interface for conducing to a maintenance and an update of a failed battery.

The present invention mainly provides the intellectual power storing system comprising an indoor controlling device and a battery array arranged in a building. After the indoor controlling device started, the intellectual power storing system makes a power provided by a power company as an initial power and provides it to an indoor apparatus for using. The indoor controlling device simultaneously receives a power generated by a self-generated power apparatus, and stores the power generated by the self-generated power apparatus to the battery array after transforming. When a power storing capacity of the battery array satisfies a threshold, the indoor controlling device provides the power provided by the battery array to the indoor apparatus for using, and stops providing the power provided by the power company. The battery array of the present invention comprises a plurality of the batteries, wherein each battery is integrated into a decoration of the building respectively.

Comparing with prior art, the present invention supports the batteries connects to from the battery array, and makes the batteries are integrate into the decoration of the building, whereby it can construct a power storing space with a large capacity without occupying the indoor space of the building. In addition, the indoor controlling device can compute the total power storing capacity and the current power storing capacity via monitoring a status of the batteries, and display the total power storing capacity and the current power storing capacity via the human-machine interface.

Furthermore, the indoor controlling device can further generate the connecting architecture of the batteries and the location of each battery according to a relationship of a series/parallel connection of the batteries each other, and display the connecting architecture and the location via the human-machine interface for conducing to a maintenance and an update of a failed battery.

In addition, the present invention manages and controls the power storing capacity of the battery array via the indoor controlling device, whereby it can automatically control that the power company providing the power to the indoor apparatus for using or the battery array providing the stored power to the indoor apparatus for using.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
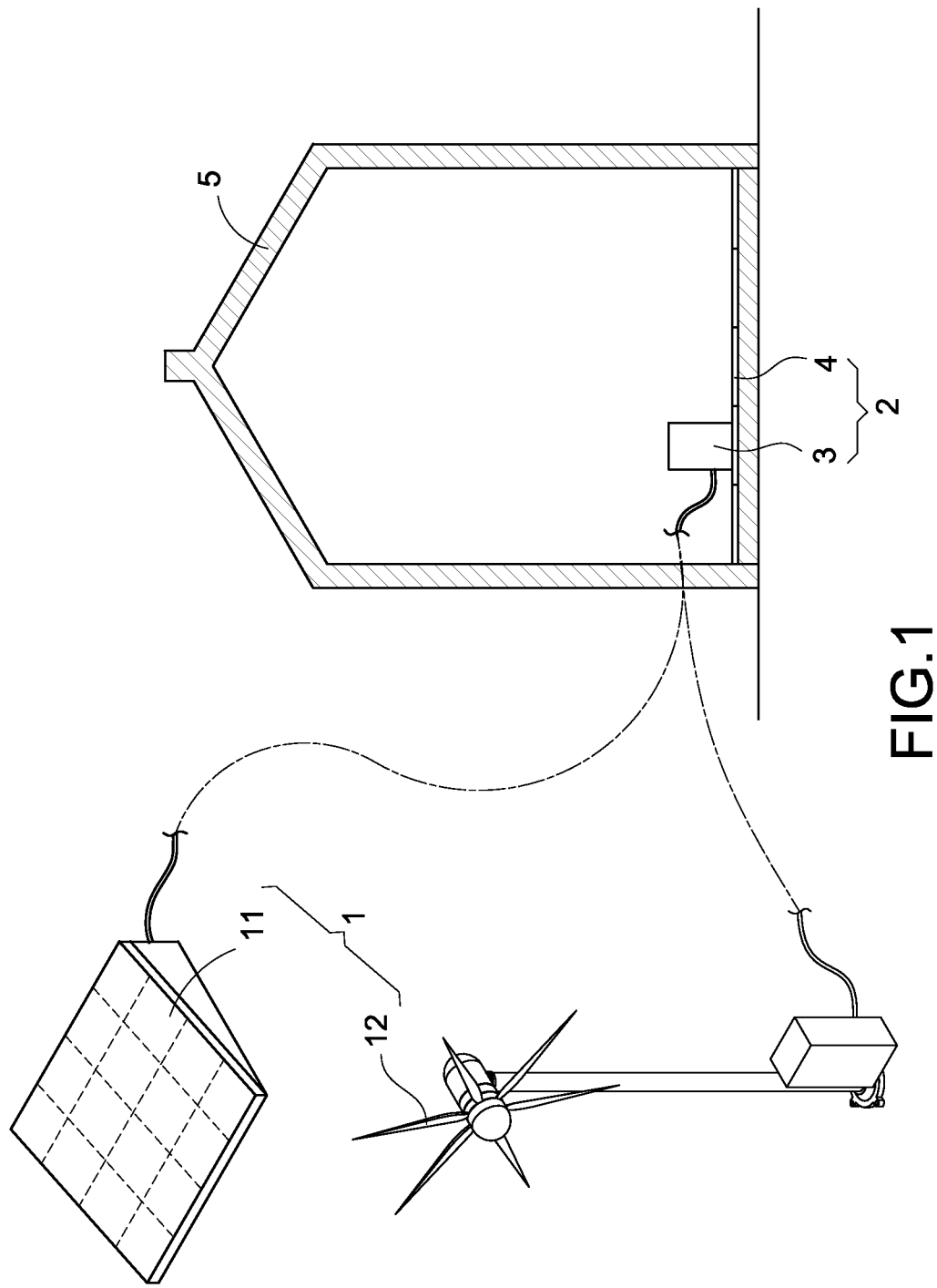
FIG. 1 is a perspective view showing scenarios of a first embodiment according to the present invention.
Figure 2:
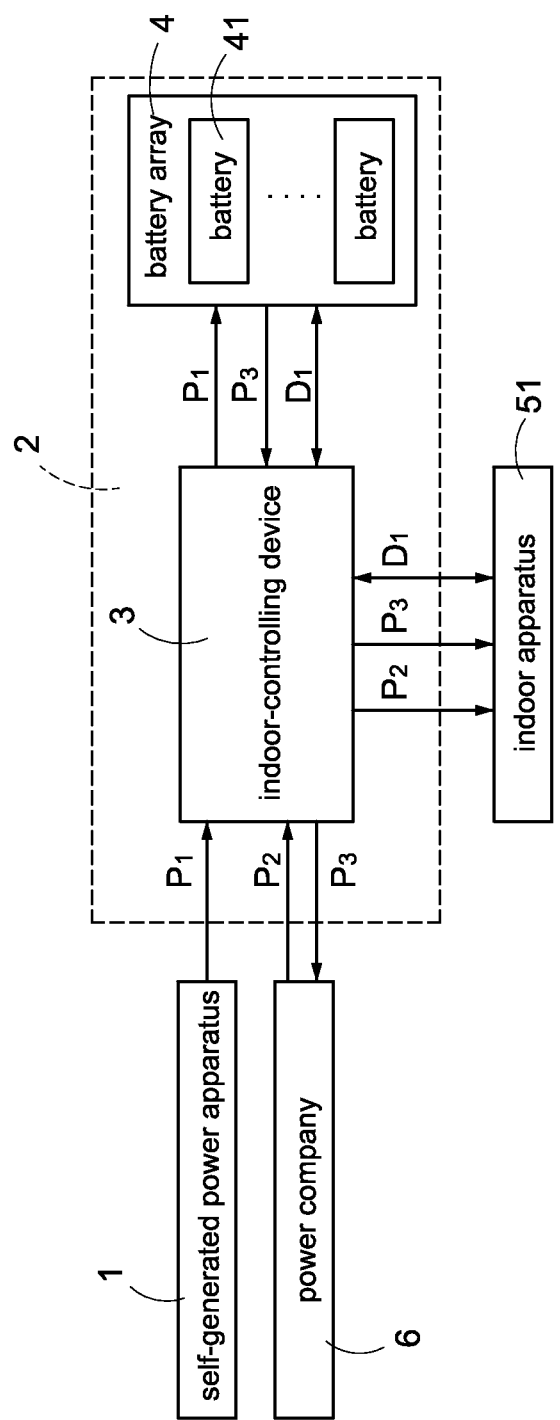
FIG. 2 is a block diagram of a power storing system of a first embodiment according to the present invention.

FIG. 1 is a perspective view showing scenarios of a first embodiment according to the present invention. FIG. 2 is a block diagram of a power storing system of a first embodiment according to the present invention. The present invention mainly disclosed an intellectual power storing system 2, the intellectual power storing system 2 comprises an indoor controlling device 3 and a battery array 4. As shown in FIG. 1, the intellectual power storing system 2 is mainly applied inside of a building, and the battery array 4 is integrated into a decoration of the building. In the embodiment of FIG. 1, the battery array 4 is mainly arranged inside of a floor of the building 5. However, in other embodiments, the battery array can also be arranged inside of a wall or a ceiling of the building 5, but not intended to limit the scope of the present invention.

Particularly, the intellectual power storing system 2 of the present invention is mainly applied to a green energy building, and the intellectual power storing system 2 can externally connect to a variety of the self-generated power apparatuses 1, such as a solar power generating apparatus and a hydraulic power generating apparatus shown in FIG. 1. Therefore, the intellectual power storing system 2 can receive the power generated by the self-generated power apparatuses 1 via the indoor controlling device 3, and store the power to the battery array 4 for executing a power storing operation after transforming. The power stored in the battery array 4 can be provided to an indoor apparatus (such as the indoor apparatus 51 shown in FIG. 2) in the building for using.

The self-generated power apparatus 1 shown in FIG. 1 is exemplified as the solar power generating apparatus 11 and the hydraulic power generating apparatus 12. In other embodiment, the self-generated power apparatus 1 can be exemplified as an indoor hydroelectric power generating apparatus, a thermoelectric power generating apparatus, a piezoelectricity power generating apparatus or the other power generating apparatuses with a capability of self-generated power, but not intended to limit the scope of the present invention.

As shown in FIG. 2, the intellectual power storing system 2 can also connect a power company 6 via a power network, and receive a power provided by the power company 6 (generally means a utility power). In this case, the indoor apparatus 51 in the building 5 can also use the power provided by the power company 6 for working.

As shown in FIG. 2, the intellectual power storing system 2 receives a first power P1 generated by the self-generated power apparatus 1 via the indoor controlling device 3. And after internal transforming, the intellectual power storing system 2 stores the first power P1 to the battery array 4. In this embodiment, the battery array 4 comprises a plurality of batteries 41. And the batteries 41 are exemplified as a ultrathin polymer battery without a risk of explosion, but not intended to limit the scope of the present invention.

Before a power storing capacity of the battery array 4 reaches a threshold, the indoor controlling device 3 can first receive a second power P2 provided by the power company 6 as a necessary power for making the intellectual power storing system 2 start to operate. At the same time, the indoor controlling device 3 can first make the second power P2 as a initial power and provides the second power to the indoor apparatus 51 for sustaining the normal operation of the indoor apparatus 51.

After the power storing capacity of the battery array 4 reaches above threshold, the intellectual power storing system 2 stops receiving and using the second power P2 provided by the power company 6, and instead receiving a third power P3 provide by the battery array 4. The third power P3 can not only maintain an operation of the intellectual power storing system 2 itself, but also further provide the third power P3 to the indoor apparatus 51 for sustaining the normal operation of the indoor apparatus 51. In this case, the intellectual power storing system 2 doesn't use the second power provide by the power company 6, so there is no extra expense for the power.

In the process of the operation of the intellectual power storing system 2, the indoor controlling device 3 can continually transmit/receive a data D1 to/from the battery array 4 and the indoor apparatus 51. Therefore, the intellectual power storing system 2 can monitor a status of each battery of the battery array 4. And the intellectual power storing system 2 can monitor and record an operating status of the indoor apparatus 51 and a related user habit.

Figure 3:
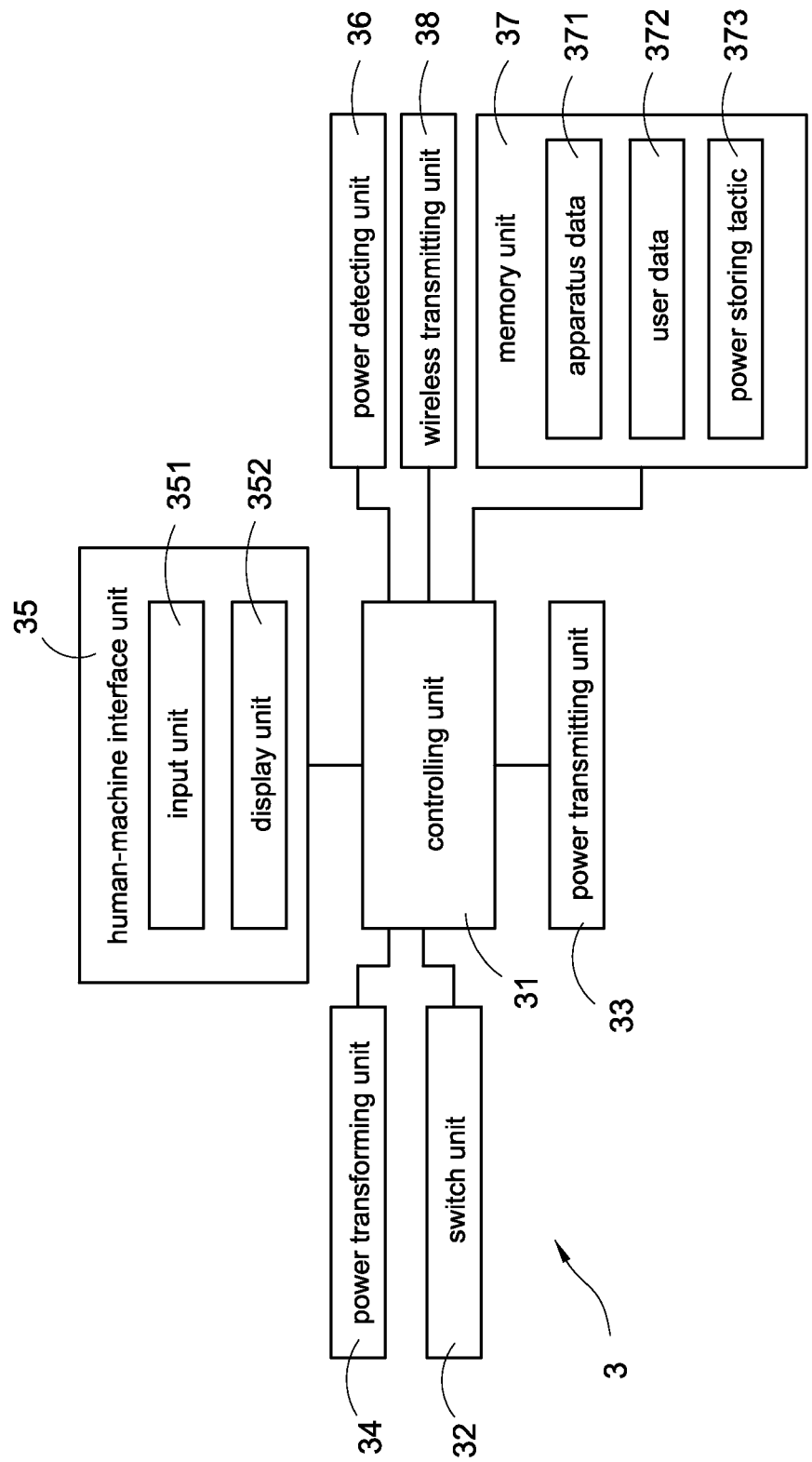
FIG. 3 is a block diagram of an indoor controlling device of a first embodiment according to the present invention.

FIG. 3 is a block diagram of an indoor controlling device of a first embodiment according to the present invention. The indoor controlling device 3 shown in FIG. 3 mainly comprises a controlling unit 31, a switch unit 32, a power transmitting unit 33, a power transforming unit 34, a human-machine interface 35, a power detecting unit 36, a memory unit 37 and a wireless transmitting unit 38, wherein the controlling unit 31 is electrically connected to the switch unit 32, the power transmitting unit 33, the power transforming unit 34, the human-machine interface 35, the power detecting unit 36, the memory unit 37 and the wireless transmitting unit 38 for controlling, integrating and transmitting the commands and the datas between each unit 32-38.

The switch unit 32 receives a trigger for switching the intellectual power storing system 2 on or off. The intellectual power storing system 2 connects to the power company 6 via the power transmitting unit 33 (such as connecting to an interface of the utility power provided by the power company 6). If the intellectual power storing system 2 is first time to operate, or the power storing capacity of the battery array 4 is not enough, the intellectual power storing system 2 first receives the second power P2 from the power company 6 for starting operation. At this time, the indoor apparatus 51 also makes the second power P2 as the initial power, and the indoor apparatus 51 uses the second power P2 for operation.

The intellectual power storing system 2 can also connect to the self-generated power apparatus 1 and the battery array 4 via the power transmitting unit 33. The intellectual power storing system 2 can receive the first power P1 from the self-generated power apparatus 1 and store the first power P1 to the battery array 4 after transforming, or receive the third power P3 from the battery array 4 for using.

The power transforming unit 34 is used to transform the first power P1 generated by the self-generated power apparatus 1, and the power transforming unit 34 stores the transformed first power P1 to the battery array 4 after transforming.

The human-machine interface 35 is mainly arranged on a surface of the indoor controlling device 3 for receiving a user operation and displaying an information needed by the user. As shown in FIG. 3, the human-machine interface 35 mainly comprises an input unit 351 and a display unit 352. The input unit 351 is exemplified as a keyboard, a mouse or a touchpad. The display unit 352 is exemplified as a liquid crystal display (LCD). Furthermore, the input unit 351 can also be integrated into the display unit 352 as a touchscreen, but not intended to limit the scope of the present invention.

The input unit 351 receives a data input of the user. For example, the user can input an apparatus data 371 related to the indoor apparatus 51 or a user data 372 related to the user via the input unit 351. And the user can also configure a power storing tactic 373 of the intellectual power storing system 2 via the input unit 351. The device data 371, the user data 372 and the power storing tactic 373 are mainly stored in the memory unit 37.

As described above, the power tactic 373 is as follows: (1) configuring that both the intellectual power storing system 2 and the indoor apparatus 51 using the second power P2 provided by the power company 6 before the power storing capacity of the battery array 4 reaches a first threshold (such as 50%); (2) configuring that both the intellectual power storing system 2 and the indoor apparatus 51 change to using the third power P3 provided by the battery array 4 after the power storing capacity of the battery array 4 reaches the first threshold; (3) configuring that the intellectual power storing system 2 receiving the third power P3 provided by the battery array 4 and feedback transporting a selling power to the power company 6 for subsidizing the expense of the power after the power storing capacity of the battery array 4 reaches a second threshold (such as 100%). However, above descriptions are just exemplary embodiments, not intended to limit the scope of the present invention.

The apparatus data 371 mainly comprises a model type, a power consumption or other information of the indoor apparatus 51. The user data 372 can comprise a personal data of the user, such as height, weight, age or other information, and above data can be continuously recorded to the memory unit 37 during using the indoor apparatus 51, but not intended to limit the scope of the present invention.

The power detecting unit 36 is electrically connected to the battery array 4 for measuring and monitoring the power storing capacity of the battery array 4. Particularly, the power detecting unit 36 can be electrically connected to each battery 41 of the battery array 4 for monitoring. Thus, the power detecting unit 36 can compute a total power storing capacity of the battery array 4 according to a number of the batteries 41, and compute the power storing capacity of the battery array 4 according to a power storing capacity of each battery of the batteries 41. Furthermore, the controlling unit 31 can compute a current percentage of a remaining power storing capacity of the battery array 4 according to the total power storing capacity and the power storing capacity.

The indoor controlling device 3 connects to the network or directly wireless connects to a wireless device (such as smartphone or notebook) of the user via the wireless transmitting unit 37. Therefore, an alert is generated to the user via the wireless transmitting 38 when the indoor controlling device 3 determines that a current status of using power is abnormal or a failed status is generated in the battery array 4. In this embodiment, the wireless transmitting 38 is exemplified as a wireless module with a function of Wi-Fi, 3G, 3.5G, 4G, bluetooth, Zigbee or radio frequency communication, but not intended to limit the scope of the present invention.

It should be noticed that the user can operate above wireless device to connect to the wireless transmitting unit 38 of the indoor controlling device 3 for remotely obtaining a using status of the intellectual power storing system 2.

Figure 4:
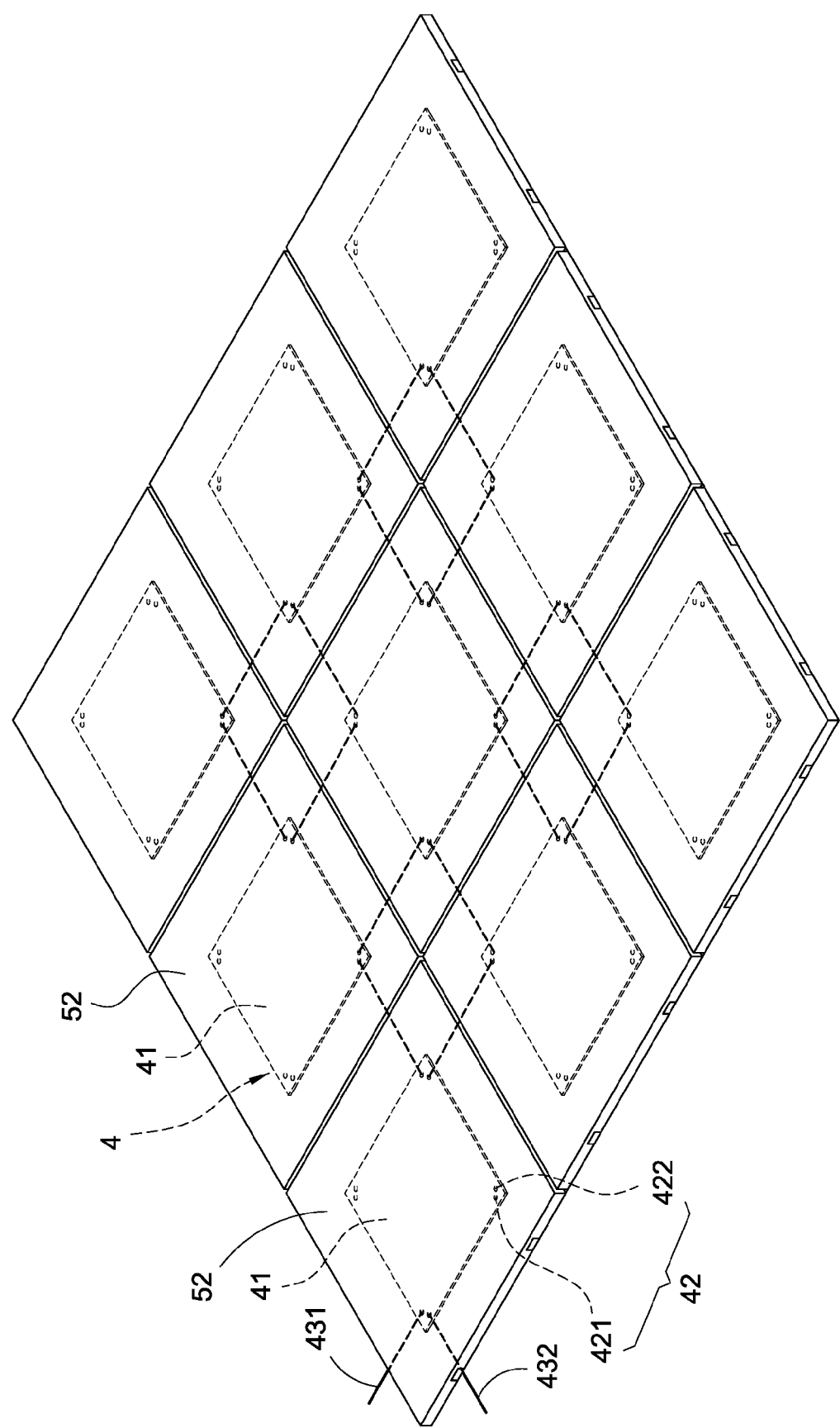
FIG. 4 is a perspective view of a battery array of a first embodiment according to the present invention.

FIG. 4 is a perspective view of a battery array of a first embodiment according to the present invention. The battery array 4 of the present invention is mainly composed of the batteries 41 in series connection or parallel connection. In the embodiment shown in FIG. 4, each battery 41 is arranged and integrated into a board 52 respectively. In this embodiment, the boards 52 are mainly used for constructing a decoration of the building 5, such as a floor, a wall or a ceiling, but not intended to limit the scope of the present invention. With the splice usage of the boards 52 is increased, the number of the battery 41 is increased. And the total power storing Each of the batteries 41 comprises at least one conductive contact consisted of a positive electrical polarity contact 421 and a negative electrical polarity contact 422 respectively. The positive electrical polarity contact 421 and the negative electrical polarity contact 422 are used to connect a positive conducting wire 431 and a negative conducting wire 432 respectively. And the batteries 41 connect to each other in the series connection or the parallel connection via the positive conducting wire 431 and the negative conducting wire 432

If the batteries 41 connect to each other in the parallel connection, even any battery 41 fails, the operation of the whole battery array 4 will not be affected. And in this embodiment, the indoor controlling device 3 can generate a connecting architecture of each battery 41 according to a relationship of the series connection or the parallel connection and graphically display the connecting architecture on the human-machine interface 35. Furthermore, the indoor controlling device 3 can also search a location of the failed battery according to the connecting architecture of each battery 41 when any battery 41 fails and graphically displaying the location of the failed battery on the human-machine interface 35, so as to facilitate a maintenance and an update of a failed battery.

In addition, above positive conducting wire 431 and above negative conducting wire 432 are not only connected between two batteries 41, but also connected between the battery 41 and the indoor controlling device 3, so that the battery array 4 can receive the first power P1 from the indoor controlling device 3 for storing power or outputting the third power P3 stored in the battery array 4 to the indoor controlling device 3.

Figure 5:
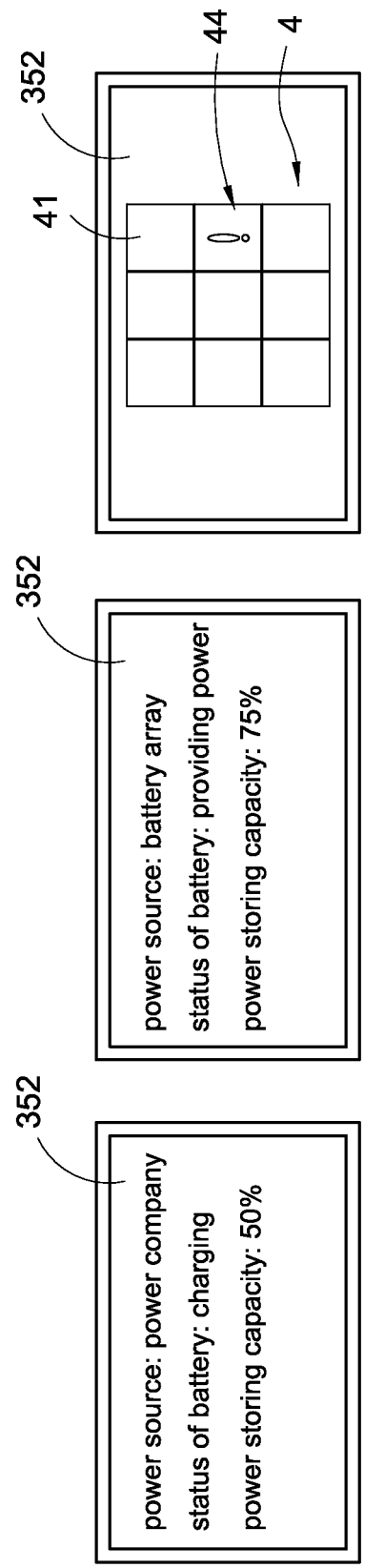
FIG. 5A is a perspective view of a display unit of a first embodiment according to the present invention.
FIG. 5B is a perspective view of a display unit of a second embodiment according to the present invention.
FIG. 5C is a perspective view of a display unit of a third embodiment according to the present invention.

FIG. 5A is a perspective view of a display unit of a first embodiment according to the present invention. As shown in FIG. 5A, the display unit 352 of the human-machine interface 35 can mainly display an current power source. In other words, the current power source is an apparatus providing the power to the intellectual power storing system 2 and the indoor apparatus 51. In the embodiment shown in FIG. 5A, the power source is the "power company". The display unit 352 can also display a current battery status of the battery array 4. In the embodiment shown in FIG. 5A, the current battery status of the battery array 4 is "charging". Furthermore, the display unit 352 can also display a current power storing capacity of the batteries of the battery array 4. In the embodiment shown in FIG. 5A, the power storing capacity of the batteries of the battery array 4 is "100%".

FIG. 5B is a perspective view of a display unit of a second embodiment according to the present invention. When the power storing capacity of the battery array 4 reaches a threshold (in other words, satisfying the power storing tactic), the intellectual power storing system 2 and the indoor apparatus 51 switch to receive the power provided by the battery array 4. At this time, as shown in FIG. 5B, the power source may change into "battery array", and the battery status of the battery array 4 is the"providing power". In the embodiment shown in FIG. 5B, the power storing capacity of the batteries of the battery array 4 is "75%"

FIG. 5C is a perspective view of a display unit of a third embodiment according to the present invention. As above descriptions, the indoor controlling device 3 can compute the connecting architecture of each battery 41 according to the relationship of the series/parallel connection of each battery 41. Therefore, when any battery 41 fails, the indoor controlling device 3 can detect the location of the failed battery according to the statuses of the series/parallel connection between the batteries 41.

And as shown in FIG. 5C, the indoor controlling device 3 can graphically display the connecting architecture of all of the batteries 41 of the battery array 4 via the display unit 352. It should be noticed that the connecting architecture of the batteries 41 shown in FIG. 5C is corresponding to the constructing architecture of the boards 52 shown in FIG. 4. Therefore, when the indoor controlling device 3 displays the location of the failed battery 44 on the display unit 352, the user can quickly search a corresponding location of the board 52 in the building according to the location of the failed battery 44 displayed on the display unit 352. And the user can further maintain or replace the failed battery 44 in the board 52.

Figure 6:
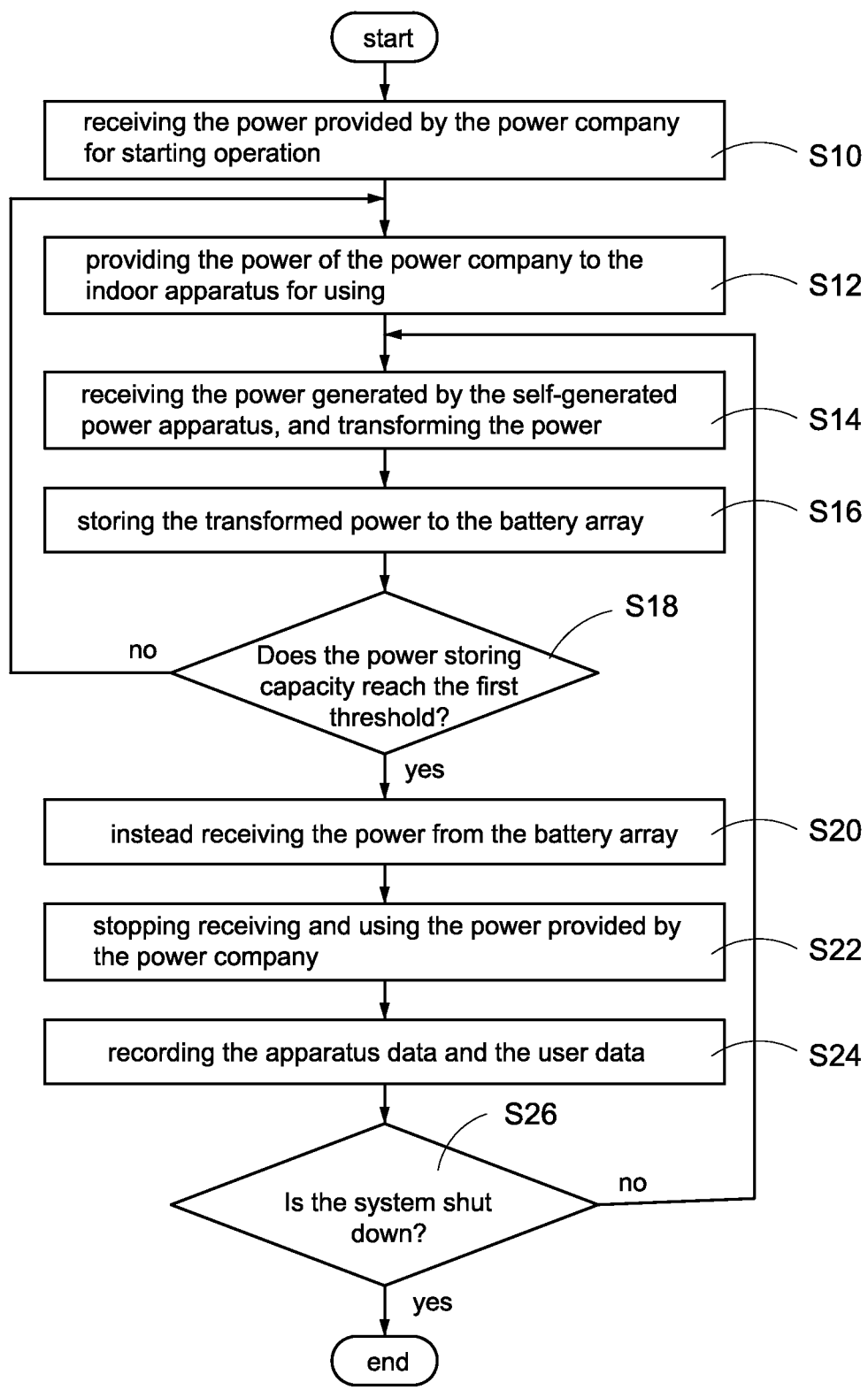
FIG. 6 is a flowchart of power storing and power providing of a first embodiment according to the present invention.

FIG. 6 is a flowchart of power storing and power providing process of a first embodiment according to the present invention. When first time to use the intellectual power storing system 2, the indoor controlling device 3 mainly receives the power provided by the power company for starting operation (step S10). And, the indoor controlling device 3 provides the power provided by the power company 6 to the indoor apparatus 51 for using (step S12).

At the same time, the indoor controlling device 3 receives the power generated by the self-generated power apparatus 1, and executes power transforming (step S14). And the indoor controlling device 3 stores the transformed power to the battery array 4 (step S16) for executing the power storing operation.

In the process of power storing of the step S14 and step S15, the indoor controlling device 3 continuously determines whether the power storing capacity of the battery array 4 satisfies a first threshold (step S18). The first threshold mainly can be the parameter of the power storing tactic 373 configured by the user. If power storing capacity of the battery array 4 has not satisfied the first threshold, then the process goes back to the step S12, the indoor controlling device 3 temporarily maintains the status that the power company 6 provides the power, and the battery array 4 continuously stores the power.

If the indoor controlling device 3 determines that the power storing capacity of the battery array 4 satisfies the first threshold (such as 70%), the indoor controlling device 3 instead receives the power from the battery array 4 (step S20). At the same time, the indoor controlling device 3 stops receiving and using the power provided by the power company 6 (step S22). After step S20, the indoor apparatus 51 receives and uses the power provided by the battery array 4 via the indoor controlling device 3 for operating.

The indoor controlling device 3 continuously records the apparatus data 371 of the indoor apparatus 51 and the user data 372 of the user during using the indoor apparatus 51, such as the using time of above indoor apparatus 51 and the user habit of the user using the indoor apparatus 51, but not intended to limit the scope of the present invention.

The indoor controlling device 3 continuously determines whether the intellectual power storing system 2 is shut down. And the indoor controlling device 3 repeatedly executes the step S14-S24 before the indoor controlling device 3 is shut down for making the battery array 4 continuously store power and provide the power to the indoor controlling device 3 and the indoor apparatus 51 for using.

Figure 7:
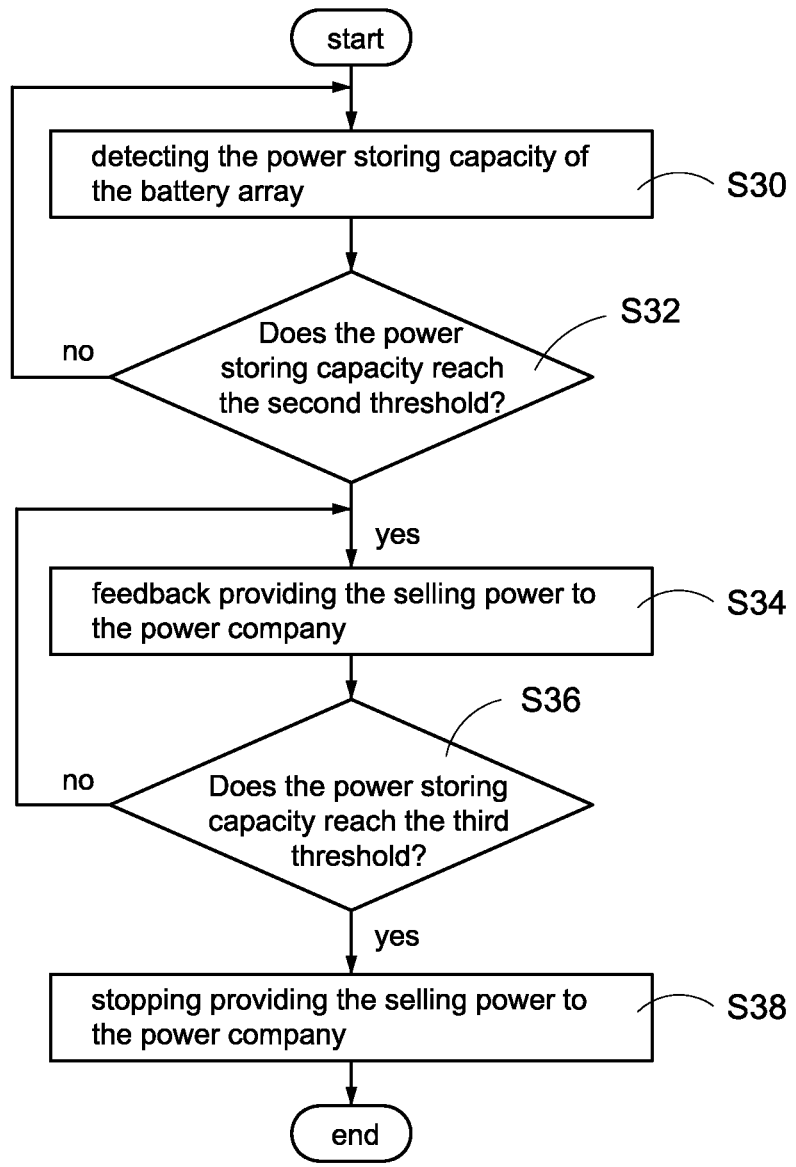
FIG. 7 is a flowchart of power feedback of a first embodiment according to the present invention.

FIG. 7 is a flowchart of power feedback process of a first embodiment according to the present invention. When the intellectual power storing system 2 is turned on for operating, the indoor controlling device 3 continuously detects the power storing capacity of the battery array 4 (step S30), and determines whether the power storing capacity reaches a second threshold (step S32). The second threshold can also be the parameter of the power storing tactic 373. If the power storing capacity of the battery array 4 reaches a second threshold (such as 100%), the indoor controlling device 3 receives the power of the battery array 4, and feedback transports the selling power to the power company 6 (step S34), so as to earn the expense of the power.

However, the power stored by the battery array 4 is mainly provided to the indoor apparatus 51 for using, feedback transporting the selling power is just an embodiment for subsidizing the expense of the power. Thus, in the process of the indoor controlling device 3 feedback transporting the selling power, the indoor controlling device 3 continuously determines whether the power storing capacity reaches a third threshold (step S36). And the indoor controlling device 3 stops selling the selling power to the power company 6 (step S38) when the power storing capacity reaches a third threshold. Therefore, the indoor controlling device 3 can sell back the selling power to the power company 6 on the premise that the indoor controlling device 3 and the indoor apparatus 51 will not be affected about using power.

Figure 8:
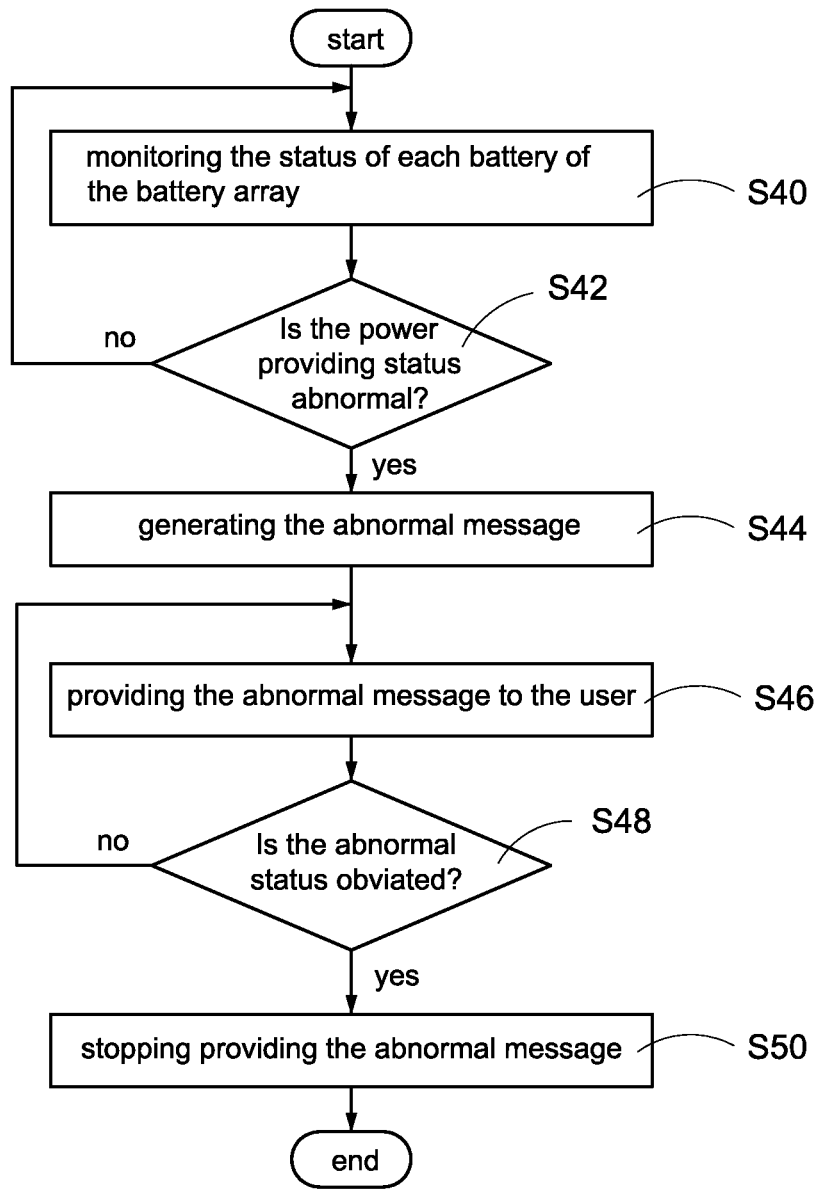
FIG. 8 is a flowchart of abnormal notification of a first embodiment according to the present invention.

FIG. 8 is a flowchart of abnormal notification process of a first embodiment according to the present invention. As described above, the indoor controlling device 3 continuously monitors the status of each battery 41 of the battery array 4 via the power detecting unit 36 (step S40). And the indoor controlling device 3 determines whether the current power providing status of the battery array 4 is abnormal according to the apparatus data 371 and the user data 372 (step S42).

For example, if the power consumption of the indoor apparatus 51 is 100 W per hour known by the apparatus data 371, but the current power provided to the indoor apparatus 51 is 500 W per hour. Thus, a status of abnormal power providing is generated. As another example, if the user didn't have a habit of using the indoor apparatus 51 at 10:00 to 12:00 in the morning according to the user data 372 (but the battery array 4 still continuously provides the power to the indoor apparatus 51 for using in above time), the status of abnormal power providing is also generated.

If the indoor controlling device 3 determines that the status of abnormal power providing is generated in the step S42, the indoor controlling device 3 generated an abnormal message (step S44), and provided the abnormal message to the user (step S46). In this embodiment, the indoor controlling device 3 can display the abnormal message on the human-machine interface 35, or transmit the abnormal message to the wireless device of the user via the wireless transmitting unit 38, but not intended to limit the scope of the present invention.

The indoor controlling device 3 can continuously determine whether the status of abnormal power providing is obviated (step S48). If it's not obviated, the indoor controlling device 3 can continuously provide the abnormal message. And if the status of abnormal power providing is obviated, the indoor controlling device 3 stops providing the abnormal message (step S50).

Figure 9:
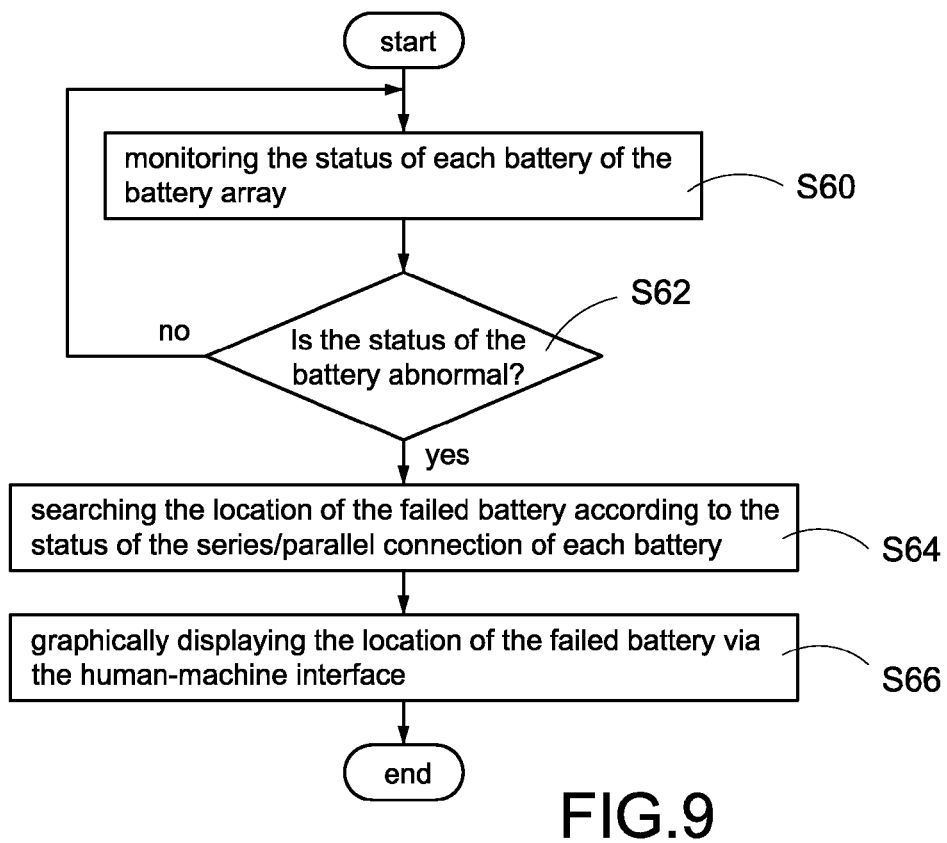
FIG. 9 is a flowchart of abnormal notification of a second embodiment according to the present invention.

FIG. 9 is a flowchart of abnormal notification of a second embodiment according to the present invention. As described above, the indoor controlling device 3 can monitor the status of each battery 41 of the battery array 4 via the power detecting 36 (step 60). And the indoor controlling device 3 determines whether the status of the battery 41 is abnormal (step S62). If the indoor controlling device 3 discovers that the status of any of the batteries 41 is abnormal; then the indoor controlling device 3 searches the location of the failed battery 44 of the batteries 41 according to the statuses of the series/parallel connection between the batteries 41 (step S64). And the indoor controlling device 3 graphically displays the location of the failed battery 44 via human-machine interface 35 (step S66).

Figure 10:
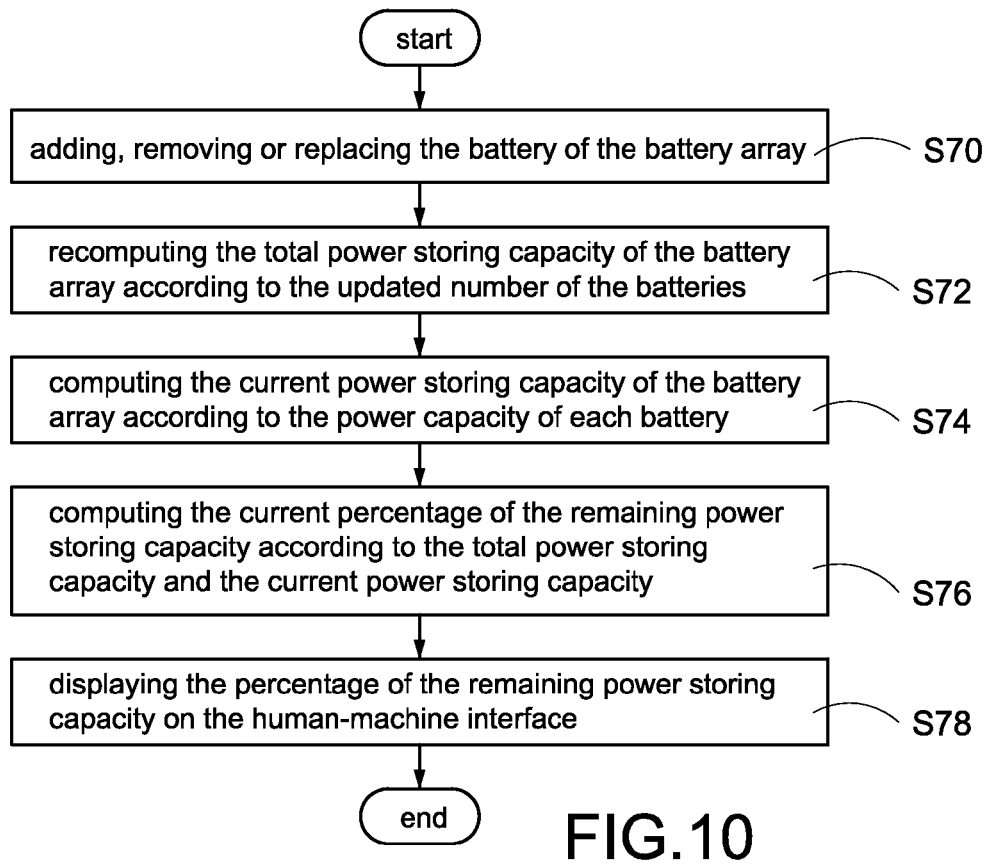
FIG. 10 is a flowchart of an update of a battery array of a first embodiment according to the present invention.

FIG. 10 is a flowchart of an update of a battery array of a first embodiment according to the present invention. As described above, the battery array 4 of the present invention can comprise the plurality of the batteries 41, With the splice usage of the boards 52 increased or decreased, the number of the battery 41 is increased or decreased. In this embodiment, the user can arbitrarily add, remove or replace any battery 41 of the battery array 4 (in other words, the user can arbitrarily add, remove or replace any board 52 in the decoration of the building)(step S70). The indoor controlling device 3 recomputes the total power storing capacity of the battery array 4 according to the updated number of the batteries 41 (step S72). And the indoor controlling device 3 computes the current power storing capacity of the battery array 4 according to the power capacity of each battery 41 (step S74).

Then, the indoor controlling device 3 computes the current percentage of a remaining power storing capacity of the battery array 4 according to the total power storing capacity and the current power storing capacity of the battery array 4 (step S76). And the indoor controlling device 3 displays the percentage of the remaining power storing capacity on the human-machine interface 35 (step S78).

Via the present invention, the user of the building 5 can conveniently effectively use the self-generated power for reducing the expense of the power paid to the power company.

As the skilled person will appreciate, various changes and modifications can be made to the described embodiment. It is intended to include all such variations, modifications and equivalents which fall within the scope of the present invention, as defined in the accompanying claims.

What is claimed is:

1. An intellectual power storing system, comprising:
 a battery array comprising a plurality of batteries, wherein each battery is arranged in a board respectively, the boards used for constructing of a decoration of a building;
 an indoor-controlling device including a controlling unit and connected to the battery array and a self-generated power apparatus, the indoor-controlling device receiving a power generated by the self-generated power apparatus, and storing the power generated by the self-generated power apparatus to the battery array after transforming;
 wherein the indoor-controlling device receives and uses a power provided by a power company before a power storing capacity of the battery array reaches a first threshold, the indoor-controlling device instead receives and uses a power provided by the battery array after the power storing capacity of the battery array reaches the first threshold, and the indoor-controlling device stops receiving and using the power provided by the power company,
 wherein the indoor-controlling device further comprises a human-machine interface unit electrically connected the controlling unit, the human-machine interface unit comprises an input unit for receiving a data input of a user and a display unit for displaying an information needed by the user;
 wherein the display unit graphically displays a number and a connecting architecture of the batteries, and graphically displays a location of a failed battery of the batteries, wherein the connecting architecture of the batteries corresponds to a constructing architecture of the boards, and
 wherein each of the batteries comprises at least one conductive contact consisted of a positive electrical polarity contact and a negative electrical polarity contact respectively, the positive electrical polarity contact and the negative electrical polarity contact electrical connected a positive conducting wire and a negative conducting wire respectively, the batteries connect to each other in a series connection or a parallel connection via the positive conducting wire and the negative conducting wire, the indoor-controlling device generates the connecting architecture of the batteries and the location of each battery according to a relationship of the series/parallel connection of each battery.

2. The intellectual power storing system according to claim 1, wherein the boards is used to construct a floor, a wall or a ceiling of the building.

3. The intellectual power storing system according to claim 1, wherein the intellectual power storing system further comprises an indoor apparatus electrically connected to the indoor controlling device, the indoor apparatus is arranged in the building, and the indoor controlling device receives the power from the power company or the battery array and provides the power to the indoor apparatus for using.

4. The intellectual power storing system according to claim 3, wherein the indoor-controlling device further comprises:
 a power transmitting unit electrically connected to the controlling unit for connecting to the power company, the self-generated power apparatus and the battery array for transmitting power;
 a power transforming unit electrically connected to the controlling unit for transforming the power generated by the self-generated power apparatus;
 a power detecting unit electrically connected to the controlling unit and the battery array, for monitoring the statuses of the batteries in the battery array; and
 a switch unit electrically connected the controlling unit, the switch unit receiving a trigger for switching the intellectual power storing system on or off.

5. The intellectual power storing system according to claim 4, wherein the indoor-controlling device further comprises a memory unit electrically connected to the controlling unit, the memory unit stores at least one apparatus data related to the indoor apparatus, a user data related to the user and a power storing tactic related to the battery array, wherein the first threshold is a parameter of the power storing tactic.

6. The intellectual power storing system according to claim 5, wherein the apparatus data comprises a using time of the indoor apparatus, the user data comprises a user habit of the user using the indoor apparatus.

7. The intellectual power storing system according to claim 4, wherein the indoor controlling device further comprises a wireless transmitting unit electrically connected to the controlling unit, the wireless transmitting unit receiving a remote operation via a network, and sending out an abnormal message when one of the batteries failed.

8. A method for managing the battery array being used to the intellectual power storing system according to claim 1, the method for managing the battery array comprising:
   a) receiving the power provided by the power company for starting operation;
   b) receiving and transforming the power generated by the self-generated power apparatus, and storing the power generated by the elf-generated power apparatus to the battery array;
   c) monitoring the statuses of the batteries of the battery array;
   d) generating a connecting architecture of the batteries according to a relationship of a series/parallel connection of the batteries wherein the connecting architecture of the batteries corresponds to a constructing architecture of the boards;
   e) searching a location of a failed battery of the batteries according to the relationship of the series/parallel connection of the batteries when a status of one of the batteries is abnormal;
   f) graphically displaying the connecting architecture and the location of a failed battery of the batteries;
   g) determining whether the power storing capacity of the battery array reaches the first threshold;
   h) receiving and using the power provided by the battery array when the power storing capacity reaches the first threshold; and
   i) stopping receiving and using the power provided by the power company when the power storing capacity reaches the first threshold.

9. The method for managing the battery array according to claim 8, wherein the method for managing the battery array further comprises a step j: recoding an apparatus data and a user data, wherein the apparatus data corresponds to a using time of the indoor apparatus, the user data corresponds to a user habit of the user using the indoor apparatus, and the apparatus data and user data are recorded during a period of the indoor apparatus being used.

10. The method for managing the battery array according to claim 9, wherein the method for managing the battery array further comprises following steps:
   k1) determining whether a power providing status of the battery array is abnormal according to the apparatus data and the user data;
   k2) generating and providing an abnormal message when the power providing status of the battery array is abnormal; and
   k3) stopping providing the abnormal message when the abnormal power providing status of the battery array is obviated.

11. The method for managing the battery array according to claim 8, wherein the method for managing the battery array further comprises following steps:
   l1) detecting the power storing capacity of the battery array;
   l2) receiving the power from the battery array and feedback transporting a selling power to the power company when the power storing capacity specifies a second threshold; and
   l3) stopping feedback transporting the selling power to the power company when the power storing capacity specifies a third threshold.

12. The method for managing the battery array according to claim 8, wherein the method for managing the battery array further comprises following steps:
   m1) computing a total power storing capacity according to a number of the batteries;
   m2) computing a power storing capacity of the battery array according to a power storing capacity of each battery of the batteries; and
   m3) computing a current percentage of a remaining power storing capacity of the battery array according to the total power storing capacity and the power storing capacity.

* * * * *